(12) United States Patent
Demaj et al.

(10) Patent No.: US 10,136,393 B2
(45) Date of Patent: Nov. 20, 2018

(54) CONTROL METHOD FOR REAL-TIME SCENE DETECTION BY A WIRELESS COMMUNICATION APPARATUS

(71) Applicants: STMicroelectronics (Rousset) SAS, Rousset (FR); STMicroelectronics SA, Montrouge (FR)

(72) Inventors: Pierre Demaj, Nice (FR); Matthieu Durnerin, Puteaux (FR); Laurent Folliot, Gourdon (FR); Ludovic Champsaur, Antibes (FR)

(73) Assignees: STMICROELECTRONICS (ROUSSET) SAS, Rousset (FR); STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 15/472,794

(22) Filed: Mar. 29, 2017

(65) Prior Publication Data

US 2018/0070315 A1   Mar. 8, 2018

(30) Foreign Application Priority Data

Sep. 7, 2016   (FR) ..................... 16 58298

(51) Int. Cl.
| | |
|---|---|
| *H04W 52/02* | (2009.01) |
| *H04M 1/725* | (2006.01) |
| *H04W 4/02* | (2018.01) |
| *H04W 4/04* | (2009.01) |
| *H04W 4/50* | (2018.01) |
| *H04W 4/38* | (2018.01) |
| *H04L 29/08* | (2006.01) |
| *G06N 99/00* | (2010.01) |

(52) U.S. Cl.
CPC ....... *H04W 52/0254* (2013.01); *H04L 67/325* (2013.01); *H04M 1/72569* (2013.01); *H04W 4/027* (2013.01); *H04W 4/043* (2013.01); *H04W 4/38* (2018.02); *H04W 4/50* (2018.02); *H04W 52/0261* (2013.01); *G06N 99/005* (2013.01); *H04L 67/22* (2013.01); *H04M 2250/12* (2013.01); *H04W 52/0209* (2013.01)

(58) Field of Classification Search
CPC ......... H04W 52/0254; H04W 52/0261; H04M 1/72569
USPC ..................... 455/522, 69.1, 127.1
See application file for complete search history.

(56) References Cited

U.S. PATENT DOCUMENTS 8,390,579 B2 *   3/2013   Petit .................... G06F 3/04883
                                                    345/173
9,313,377 B2 *   4/2016   Todeschini ............. H04N 5/232
(Continued)

OTHER PUBLICATIONS

Barchiesi, D. et al., "Acoustic Scene Classification Classifying Environments from the Sounds they Produce," IEEE Signal Processing Magazine, May 2015, 20 pages.
(Continued)

*Primary Examiner* — Raymond Dean
(74) *Attorney, Agent, or Firm* — Slater Matsil, LLP

(57) ABSTRACT

A control method for real-time scene detection by a wireless communication apparatus equipped with at least one environmental measurement sensor is disclosed. A temporal adjustment of the instants of activation of the detection is based on measurement values delivered by the at least one environmental measurement sensor at instants of measurement.

20 Claims, 2 Drawing Sheets

(56) References Cited

U.S. PATENT DOCUMENTS

| | | |
|---|---|---|
| 2010/0302028 A1 | 12/2010 | Desai et al. |
| 2012/0191966 A1* | 7/2012 | Jovicic ............... H04W 8/005 |
| | | 713/100 |
| 2013/0238535 A1 | 9/2013 | Leppanen et al. |
| 2014/0247206 A1 | 9/2014 | Grokop et al. |
| 2015/0023602 A1* | 1/2015 | Wnuk ............. G06F 17/30247 |
| | | 382/190 |
| 2015/0289107 A1 | 10/2015 | Aksamit |

OTHER PUBLICATIONS

Schuchhardt, M. et al., "CAPED: Context-Aware Personalized Display Brightness for Mobile Devices," 2014 International Conference on Compilers, Architecture and Synthesis for Embedded Systems (Cases), Oct. 12, 2014, 10 pages.

* cited by examiner

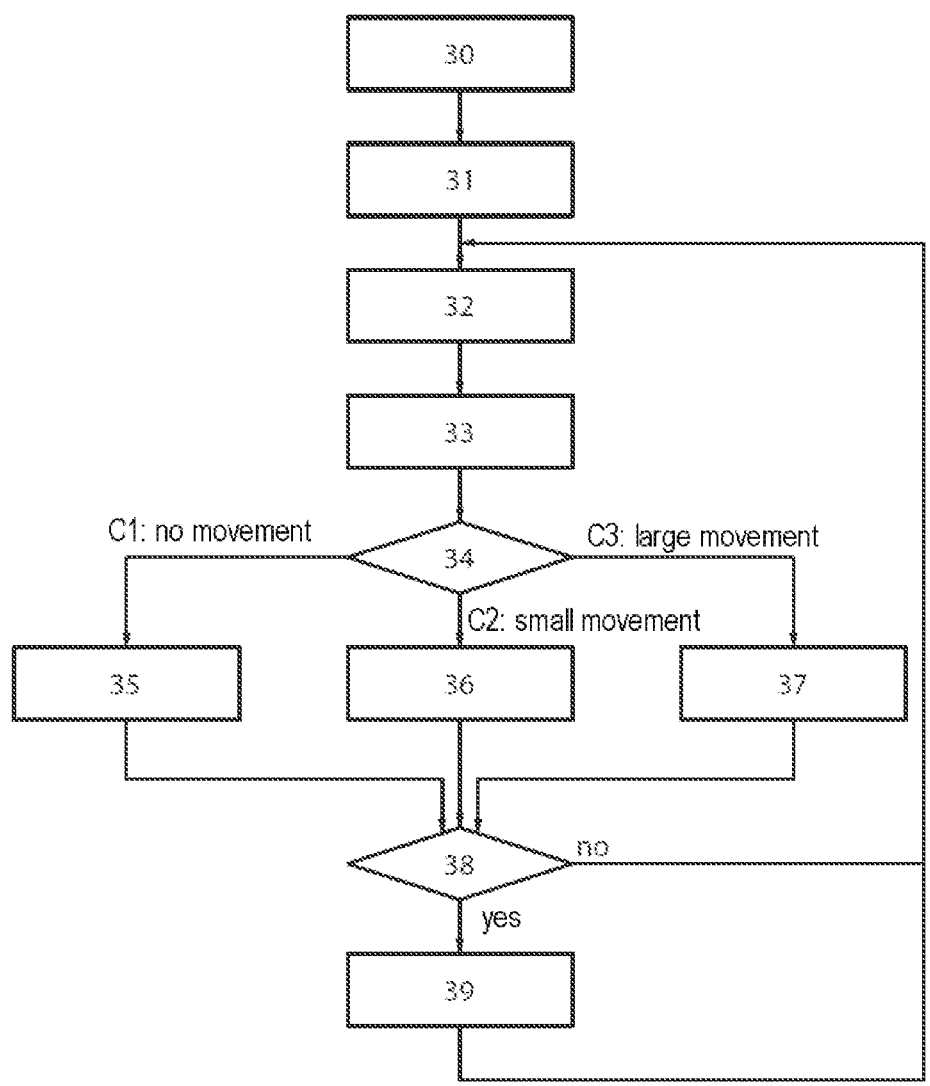

CONTROL METHOD FOR REAL-TIME SCENE DETECTION BY A WIRELESS COMMUNICATION APPARATUS

CROSS-REFERENCE TO RELATED APPLICATIONS

This application claims priority to French Patent Application No. 1658298, filed on Sep. 7, 2016, which application is hereby incorporated herein by reference.

TECHNICAL FIELD

Applications and embodiments of the invention relate to real-time scene detection by a wireless communication apparatus.

BACKGROUND

Some wireless communication apparatus, for example, some types of smartphones or tablets, are currently capable of providing scene detection, making it possible to determine the environment in which the user of the telephone or tablet is located. This may also enable a third party, for example, an advertiser or a cultural body, to send relevant information related to the place where the user of the apparatus is located.

Thus, for example, if the user is located in a given tourist area, the addresses of restaurants near his location can be sent to him in this way. Similarly, he can be sent information relating to certain monuments near his location.

It is also possible to carry out some adjustments automatically by means of the telephone (for example, an audio sensor is used to detect when the location is quiet, and the telephone then sets itself to vibration mode).

At present, scene detection by the telephone may be carried out at fixed intervals. However, this offers no flexibility, and may result in undue power consumption which is detrimental to the life of the telephone battery.

Another solution may be that of using the GPS application of the telephone for the real-time location of the user and consequently the detected scene.

Here again, however, the use of the GPS function is detrimental to the power consumption of the telephone.

SUMMARY

Applications and embodiments of the invention relate to real-time scene detection by a wireless communication apparatus, for example an intelligent cellular mobile telephone ("smartphone"), or alternatively a digital tablet, equipped with at least one environmental measurement sensor such as an accelerometer.

Applications and embodiments of the invention can improve decision-making regarding the detection of a scene by a wireless communication apparatus such as a cellular mobile telephone or a tablet, in order to provide greater flexibility while having a reduced impact on power consumption.

According to one application and embodiment, use is made of the environmental measurement sensor, or at least some of the environmental measurement sensors, which is or are already generally present on a cellular mobile telephone or a tablet, for example an accelerometer and possibly a magnetometer, a gyroscope, or an audio sensor, to determine the instants of activation of the scene detection.

Thus, according to one aspect, a method is proposed for controlling real-time scene detection by a wireless communication apparatus equipped with at least one environmental measurement sensor, the method comprising a temporal adjustment of the instants of activation of the detection based on measurement values delivered by the at least one environmental measurement sensor at instants of measurement.

The term "scene detection" is taken to mean, notably, discrimination of the scene in which the wireless communication apparatus is located. There are a number of known solutions for scene detection (discrimination). These solutions, use, for example, one or more dedicated sensors, usually associated with a specific algorithm.

These sensors may be accelerometers and/or gyroscopes and/or magnetometers and/or microphones, for example, notably in applications requiring very low power consumption. This is a multimodal approach. In this case, also, an example of a specific algorithm may be an algorithm using a binary decision tree based on descriptors or attributes resulting from specific processes (such as filtering) performed on the raw data output from the sensors. These descriptors may be, for example, averages, energy values, variances, or the like.

The expression "environmental measurement sensor" is taken to mean, notably, any type of sensor capable of providing information about the environment in which the wireless communication apparatus is located, including, for example, spatio-temporal characteristics of the environment of the apparatus, for example whether or not the nature of the environment is temporally fixed, the rate of variation of the spatio-temporal modification of the environment (based on the detection of the movement of the apparatus), and/or sound and/or spatial and/or visual characteristics of this environment, for example the noise level of the environment and/or the brightness level of the environment (based, for example, on sensors such as barometers, proximity sensors or optical sensors).

The sensor or sensors used for the scene detection may be different from the environmental sensor or sensors.

Since this is, notably, in a context in which the apparatus is constantly switched on ("Always On") and the battery life is an important criterion, at least one of the environmental sensors may also be a sensor used for the scene detection. This may be the case, for example, although not exclusively, for an accelerometer which may be used both as an environmental sensor, to provide an indication of the intensity of the movement of the apparatus, and as a sensor contributing to the scene detection.

According to one embodiment, the method further comprises the determination of a number of criteria, typically at least two, such as criteria defining the intensity of the movement of the apparatus (a telephone, for example), on the basis of the measurement values and a temporal adjustment of the instants of activation based on these criteria.

The determination of these criteria may advantageously comprise the use of a classification algorithm or classifier, and preferably the use of a meta-classification algorithm or meta-classifier which, for example, performs a majority vote on the last five measurements in order to avoid gross errors.

The method then advantageously comprises a temporal adjustment of the instants of measurement based on these criteria and a reinitialization of the determination of these criteria (by reinitialization of the classifier for example) at each temporal adjustment of the instants of measurement.

This temporal adjustment of the instants of measurement may comprise, for example, an adjustment of the time interval separating two successive instants of measurement.

The instants of activation of the scene detection may be identical to the instants of measurement of the measurements delivered by the measurement sensors. This is the case, notably, when the environmental measurement sensors are also used for the scene detection.

These instants of activation may therefore be different from the instants of measurement, for example if the environmental sensors used are different from those used for the scene detection. Accordingly, the method then comprises a temporal adjustment of the instants of activation, such as an adjustment of the time interval separating two successive instants of activation.

By way of example, the time interval separating two instants of measurement (or two instants of activation) when there is no movement or little movement may be increased, and this time interval may be reduced when the movement is large, providing efficient monitoring of changes in the environment of the telephone when there is a rapid movement, while saving power when the telephone is not moving.

The at least one environmental measurement sensor may comprise at least one accelerometer.

It is also possible to use an environmental sensor of the audio sensor type, for example a microphone.

Thus the wireless communication apparatus may be equipped with a plurality of environmental sensors, in which case a temporal adjustment is advantageously performed on the instants of activation of the detection, based on measurement values delivered by the sensors at instants of measurement.

The environmental measurement sensors may be selected from the group composed of an accelerometer, a gyroscope, a magnetometer, an audio sensor, a barometer, a proximity sensor, and an optical sensor.

In other words, it is possible to use one or more accelerometers, or an accelerometer in combination with a gyroscope, or possibly in combination with a magnetometer or with a number of audio sensors, or one or more audio sensors in combination with one or more accelerometers, or a gyroscope or a magnetometer.

According to another aspect, a wireless communication apparatus includes a detector that is configured to detect a scene in real time, and environmental measurement sensor, and a controller that is configured to perform a temporal adjustment of the instants of activation of the detection based on measurement values delivered by the at least one environmental measurement sensor at instants of measurement.

The detector may include the environmental measurement sensor, and, if there is a number of measurement sensors, one or more of the environmental measurement sensors.

According to one embodiment, the apparatus further comprises a processor configured to perform a determination of a number of criteria on the basis of the measurement values, and the controller is configured to perform the temporal adjustment of the instants of activation based on these criteria.

The processor may comprise a state machine executing a classification algorithm, preferably a meta-classification algorithm.

According to one embodiment, the apparatus further comprises an actuator configured to perform a temporal adjustment of the instants of measurement on the basis of the criteria and to reinitialize the processor at each temporal adjustment of the instants of measurement.

The actuator may be configured to perform an adjustment of the time interval separating two successive instants of measurement.

The controller may also be configured to perform an adjustment of the time interval separating two successive instants of activation.

If the apparatus comprises a number of environmental measurement sensors, which may be selected from the group composed of an accelerometer, a gyroscope, a magnetometer, an audio sensor, a barometer, a proximity sensor, and an optical sensor, the controller is configured to perform a temporal adjustment on the instants of activation of the detection on the basis of measurement values delivered by the sensors at instants of measurement.

BRIEF DESCRIPTION OF THE DRAWINGS

Other advantages and features of the invention will be apparent from a perusal of the detailed description and applications and embodiments which are not limiting in any way, and the appended drawings, in which:

FIGS. 1 to 3 show in a schematic way different applications and embodiments of the invention.

DETAILED DESCRIPTION OF ILLUSTRATIVE EMBODIMENTS

Figure 1:
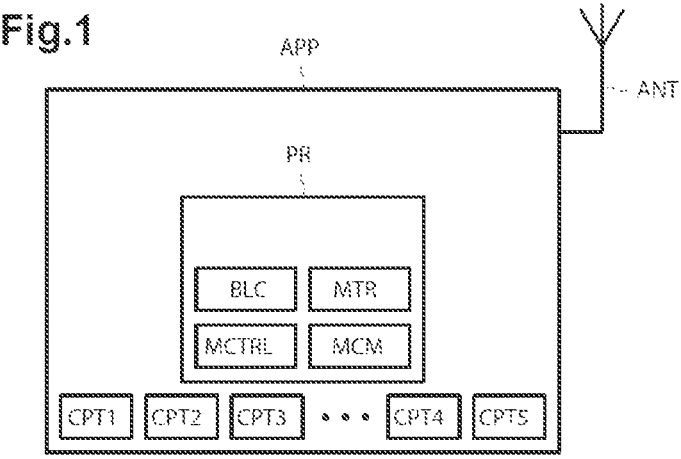

In FIG. 1, the reference APP denotes an electronic apparatus, for example, a wireless communication apparatus equipped with an antenna ANT. This apparatus may be a cellular mobile telephone such as an intelligent telephone (smartphone) or a digital tablet.

In this case, the apparatus APP comprises a number of environmental measurement sensors CPT1-CPT5, although this number is not limiting.

For guidance, the sensors CPT1, CPT2, CPT3, CPT4, CPT5 may be selected from the group composed of an accelerometer, a gyroscope, a magnetometer, an audio sensor such as a microphone, a barometer, a proximity sensor, and an optical sensor.

Evidently, the apparatus may be equipped with a number of accelerometers and/or a number of gyroscopes and/or a number of magnetometers and/or a number of audio sensors and/or a barometer, and/or one or more proximity sensors, and/or one or more optical sensors.

At least one, and in general at least some, of these environmental measurement sensors may, particularly in a multimodal approach, be combined with a conventional discrimination algorithm, of the binary decision tree type for example, intended to operate, for example, on filtered raw data output from these sensors, to form a detector that is configured to detect a scene. The detector may thus, for example, detect whether the apparatus APP is located in a particular type of environment (a restaurant, a moving vehicle, or other environment).

In a variant, the apparatus APP could be equipped with a specific sensor, for example, the sensor CPT1, which is different from the aforementioned environmental sensors, for example a micro-camera capable of detecting a scene in the environment of the apparatus.

Since this is in a context in which the apparatus is constantly switched on (Always On) and the battery life is an important criterion, it is preferable if the sensors used for the scene detection are one or more of the aforementioned environmental sensors.

By way of non-limiting example, let us now assume that all the environmental sensors CPT1-CPT5 contribute to the scene detection.

In addition to these sensors, the apparatus APP comprises a unit BLC capable of interacting with the sensors CPTi to process the detected scene and to transmit the information via the antenna ANT of the apparatus.

The apparatus further comprises a controller MCTRL configured to perform a temporal adjustment of the instants of activation of the scene detection, based on measurement values delivered by the environmental measurement sensors CPT1-CPT5 at instants of measurement.

In this example, the instants of activation of the scene detection are the instants of measurement. Consequently, notably in a variant using a specific detection sensor, the instants of activation of the scene detection may be different from the instants of measurement.

The apparatus APP further comprises a processor MTR configured to determine, in this case, a number of criteria on the basis of the measurement values delivered by the sensors CPT1-CPT5.

The apparatus APP further comprises an actuator MCM configured to perform a temporal adjustment of the instants of measurement on the basis of the criteria and to reinitialize the processor at each temporal adjustment of the instants of measurement.

These various units BLC, MTR, MCTRL and MCM are implemented, for example, in the form of software modules in the processor PR of the apparatus APP. In other embodiments, the various units can be implemented in hardware, for example, an application specific integrated circuit.

Figure 2:
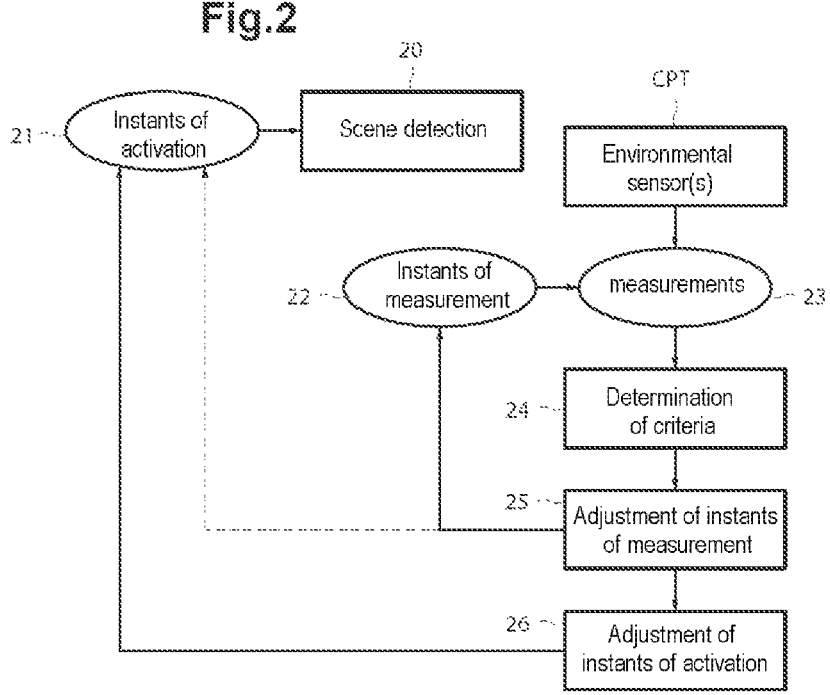

Reference will now be made more particularly to FIG. 2 for the purpose of describing an embodiment of the method according to the invention.

As shown in FIG. 2, the detection 20 of the scene located in the environment of the apparatus takes place at instants of activation 21.

Additionally, the sensors CPT1 (i=1 to 5) deliver measurements 23 at instants of measurement 22. Criteria for the adjustment 25 of these instants of measurement are also determined, in a step 24.

If the instants of measurement are identical to the instants of activation, the adjustment of the instants of measurement corresponds to the adjustment of the instants of activation.

If the instants of activation are different from the instants of measurement, then the instants of activation are adjusted in step 26.

Reference will now be made more particularly to FIG. 3, for the purpose of describing an example of the determination of the criteria and the adjustment of the instants of measurement.

This is performed by a state machine, for example. After an initialization phase 30, a default initial value is set, in a step 31, for the time interval between two instants of measurement. This default initial value may be of the order of several seconds, for example 2, 4 or 6 seconds.

Then, at the end of each interval (step 32), the measurement values supplied by the environmental sensors are acquired (step 33). Additionally, in a step 34, a classification algorithm (classifier) is applied, for the determination, in this case, of three criteria based on the acquired measurement values, namely a first criterion C1 representing an "absence of movement," a second criterion C2 representing a "small movement" and a third criterion C3 representing a "strong movement."

A classification algorithm, or classifier, is an algorithm well known to those skilled in the art. In this connection, a person skilled in the art may find all necessary information in, for example, Jason Brownlee's book "Master Learning Algorithms, discover how they work and implement them from scratch," 2016.

Thus, in a particularly simple implementation using few criteria, for example three criteria as in the present case, a decision tree may be used as a classifier, following a learning phase on a database of measurements from the environmental sensors. This decision tree is particularly simple to use, and only requires several bytes of memory and an operating frequency of less than 0.01 MHz.

It is therefore preferable to use a meta-classification algorithm (or meta-classifier), also well-known to those skilled in the art, which, for example, takes a majority vote among the last five measurements supplied by the sensors, for example, so as to avoid gross errors.

Depending on the resulting criterion at the end of step 34, three different values will be defined for the time interval separating two instants of measurement of the sensors.

Thus, in step 35, a temporal interval value of the order of 10 seconds may be set, while this value may be set to 6 seconds in step 36 and to two seconds in step 37.

In other words, as the speed of the movement increases, the time interval between two instants of measurement is reduced.

In step 38, a check is made as to whether this time interval value has been modified relative to the previously stored value.

If this is the case, then in step 39 the classifier is reinitialized before a new determination of the criteria is performed.

In the contrary case, there is no reinitialization of the classifier.

Although it is possible to use at least one accelerometer, or a number of accelerometers, more precise results will be obtained by the additional use of a gyroscope or possibly a magnetometer.

In view of the above, it may be particularly helpful to use audio sensors, which are useful descriptors of the environment. This is because, if the apparatus is not moving, the audio sensor may be useful for detecting the nature of the environment concerned. On the basis of the change in the audio environment, a decision may then be made to increase or decrease the interval between the different instants of measurement.

Evidently, depending on the application, it is possible to use environmental sensors of the accelerometer, gyroscope or magnetometer type, or audio sensors, or a combination of these two types of sensors. Thus, in order to simplify the classifier, it may advantageously be decided not to use the multimodal approach for the adjustment of the instants of measurement, that is to say not to use a combination of these two types of sensors.

In the above description, the adjustment of the time interval between the instants of measurement determines the periodicity of the scene detection.

However, it would also be possible, by way of variant, to arrange for at least some of the environmental sensors to have instants of measurement that are regularly spaced, at every 20 ms for example in the case of an accelerometer, and to provide an adjustment of the periodicity, usually greater, of the instants of activation of the detection, which will be independent of this constant measurement interval, but will depend on the measurement values supplied by these sensors.

What is claimed is:

1. A method for real-time scene detection by a wireless communication apparatus equipped with an environmental measurement sensor, the method comprising:
performing real-time scene detection at instants of activation;
using the environmental measurement sensor to perform environmental measurements at instants of measurement;
determining, by a processor of the wireless communication apparatus, a criteria based on values corresponding to the environmental measurements, wherein determining the criteria comprises executing, by the processor, instructions of a meta-classification algorithm stored in a non-transitory computer readable storage medium coupled to the processor, and wherein the criteria is indicative of a movement of the wireless communication apparatus based on values corresponding to the environmental measurements; and
performing a temporal adjustment of the instants of activation of the detection based on the criteria.

2. The method according to claim 1, further comprising performing a temporal adjustment of the instants of measurement based on the criteria and performing a reinitialization of the determining the criteria at each temporal adjustment of the instants of measurement.

3. The method according to claim 2, wherein performing the temporal adjustment of the instants of measurement comprises performing an adjustment of a time interval separating two successive instants of measurement.

4. The method according to claim 1, wherein the temporal adjustment of the instants of activation comprises an adjusting a time interval separating two successive instants of activation.

5. The method according to claim 1, wherein the instants of measurement are identical to the instants of activation.

6. The method according to claim 1, wherein the environmental measurement sensor comprises an accelerometer.

7. The method according to claim 1, wherein the environmental measurement sensor comprises an audio sensor.

8. A wireless communication apparatus, comprising:
a detector configured to detect a scene in real time at instants of activation;
an environmental measurement sensor configured to deliver measurement values at instants of measurement;
a non-transitory computer readable storage medium configured to store instructions of a meta-classification algorithm;
a processor coupled to the non-transitory computer readable storage medium and configured to determine a criteria based on the measurement values by executing the instructions of the meta-classification algorithm stored in the non-transitory computer readable storage medium, wherein the criteria is indicative of a movement of the wireless communication apparatus based on the measurement values delivered by the environmental measurement sensor; and
a controller configured to perform a temporal adjustment of the instants of activation based on the criteria.

9. The apparatus according to claim 8, further comprising an actuator configured to perform a temporal adjustment of the instants of measurement based on the criteria and to reinitialize the processor at each temporal adjustment of the instants of measurement.

10. The apparatus according to claim 9, wherein the actuator is configured to perform an adjustment of a time interval separating two successive instants of measurement.

11. The apparatus according to claim 8, wherein the controller is configured to perform an adjustment of a time interval separating two successive instants of activation.

12. The apparatus according to claim 8, wherein the environmental measurement sensor comprises an accelerometer.

13. The apparatus according to claim 8, wherein the environmental measurement sensor comprises an audio sensor.

14. The apparatus according to claim 8, wherein the apparatus comprises a plurality of environmental measurement sensors, the controller being configured to perform the temporal adjustment of the instants of activation of the detection based on measurement values delivered by the sensors at the instants of measurement.

15. The apparatus according to claim 14, wherein each environmental measurement sensor comprises a sensor selected from the group consisting of an accelerometer, a gyroscope, a magnetometer, an audio sensor, a barometer, a proximity sensor, and an optical sensor.

16. The apparatus according to claim 14, wherein the detector includes at least one the environmental measurement sensors.

17. The apparatus according to claim 8, wherein the apparatus is a cellular mobile telephone or a digital tablet.

18. A method for real-time scene detection by a wireless communication apparatus comprising an environmental measurement sensor, the method comprising:
performing environmental measurements at instants of measurement using the environmental measurement sensor, wherein the instants of measurement are separated by a first time interval;
determining, by a processor of the wireless communication apparatus, a movement of the wireless communication apparatus based on values corresponding to the environmental measurements, wherein determining the movement comprises executing, by the processor, instructions of a meta-classification algorithm stored in a non-transitory computer readable storage medium coupled to the processor; and
adjusting the first time interval based on the movement.

19. The method according to claim 18, wherein adjusting the first time interval based on the movement comprises decreasing the first time interval as a speed of the movement increases.

20. The method according to claim 18, wherein the environmental measurement sensor comprises a sensor selected from the group consisting of an accelerometer, a gyroscope, a magnetometer, an audio sensor, a barometer, a proximity sensor, and an optical sensor.

* * * * *